United States Patent
Chapman et al.

(10) Patent No.: US 9,890,662 B2
(45) Date of Patent: Feb. 13, 2018

(54) RAM AIR TURBINE STOW LOCK PIN

(71) Applicant: HAMILTON SUNDSTRAND CORPORATION, Charlotte, NC (US)

(72) Inventors: David Norman Chapman, Rockford, IL (US); David Everett Russ, Rockford, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 313 days.

(21) Appl. No.: 14/606,773

(22) Filed: Jan. 27, 2015

(65) Prior Publication Data

US 2016/0214741 A1 Jul. 28, 2016

(51) Int. Cl.
| | |
|---|---|
| *F01D 25/28* | (2006.01) |
| *B64D 41/00* | (2006.01) |
| *B64F 5/00* | (2017.01) |
| *F02C 7/32* | (2006.01) |

(52) U.S. Cl.
CPC ......... *F01D 25/285* (2013.01); *B64D 41/007* (2013.01); *B64F 5/00* (2013.01); *F02C 7/32* (2013.01); *F05D 2220/34* (2013.01); *F05D 2220/50* (2013.01); *F05D 2230/72* (2013.01); *F05D 2260/31* (2013.01); *F05D 2260/36* (2013.01); *Y02T 50/44* (2013.01); *Y02T 50/671* (2013.01)

(58) Field of Classification Search
USPC ........ 244/58, 102 R, 137.4, 102 SL; 416/14, 416/142, 220 R, 48, 142 R, 155, 87, 416/140 R; 440/54
See application file for complete search history.

(56) References Cited

U.S. PATENT DOCUMENTS

| | | | | |
|---|---|---|---|---|
| 5,123,614 A | * | 6/1992 | Whitehouse | B64D 41/007 244/102 SL |
| 7,416,392 B2 | * | 8/2008 | Russ | B64D 41/007 416/142 |
| 8,651,815 B2 | * | 2/2014 | Russ | B64D 41/007 416/143 |
| 8,876,474 B2 | * | 11/2014 | Russ | B64D 41/007 416/137 |
| 8,931,734 B2 | * | 1/2015 | Russ | F03D 9/00 244/58 |
| 9,108,742 B2 | * | 8/2015 | Russ | B64D 41/007 |
| 9,365,295 B2 | * | 6/2016 | Sasscer | B64D 41/007 |
| 2006/0266114 A1 | * | 11/2006 | Pichel | F01D 5/027 73/460 |
| 2007/0237640 A1 | | 10/2007 | Russ | |
| 2011/0115880 A1 | | 5/2011 | Yoo et al. | |

(Continued)

OTHER PUBLICATIONS

Office Action dated Sep. 19, 2017 in corresponding French Patent Application No. 1650593(7 pages).

(Continued)

*Primary Examiner* — Jessica Cahill
*Assistant Examiner* — Daphne M Barry (57) ABSTRACT

What is defined is a stow lock pin for use in preventing deployment of a ram air turbine of an aircraft, the aircraft having a first distance from the ram air turbine to an access window. The stow lock pin includes a tip configured to be received by a slot of the ram air turbine. The stow lock pin also includes a rod coupled to the tip and having an axial distance that is larger than the first distance.

19 Claims, 5 Drawing Sheets

(56) References Cited

U.S. PATENT DOCUMENTS

| | | | |
|---|---|---|---|
| 2012/0173076 A1* | 7/2012 | Anderson | F02B 39/16 |
| | | | 701/34.4 |
| 2013/0064647 A1 | 3/2013 | Hashimoto | |
| 2013/0256453 A1 | 10/2013 | Russ | |
| 2013/0287569 A1* | 10/2013 | Bannon | F01D 25/28 |
| | | | 416/46 |
| 2014/0010633 A1 | 1/2014 | Meyer et al. | |
| 2014/0099190 A1 | 4/2014 | Meyer et al. | |

OTHER PUBLICATIONS

European Search Report for Patent Application No. EP17162067.7, dated Aug. 30, 2017 (5 pages).

\* cited by examiner

RAM AIR TURBINE STOW LOCK PIN

FIELD

The present disclosure relates to ram air turbines of aircraft, and more particularly to a system for ensuring ram air turbines remain stowed during maintenance of the aircraft.

BACKGROUND

Ram air turbines are generally used in aircraft to provide supplemental and/or emergency power to the aircraft by utilizing air flow to rotate a turbine. Ram air turbines may provide electrical power, hydraulic power, or both. Ram air turbines include an actuator that causes the ram air turbine to extend away from an aircraft into a flow of air. The ram air turbine may cause injury to person or property if accidentally deployed while the aircraft is undergoing maintenance on the ground.

SUMMARY

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

What is defined is a stow lock pin for use in preventing deployment of a ram air turbine of an aircraft, the aircraft having a first distance from the ram air turbine to an access window. The stow lock pin includes a tip configured to be received by a slot of the ram air turbine. The stow lock pin also includes a rod coupled to the tip and having an axial distance that is larger than the first distance.

Also described is a system. The system includes a ram air turbine defining a slot and configured to be coupled to an aircraft such that a first distance exists between the ram air turbine and an access window of the aircraft. The system also includes a stow lock pin. The stow lock pin includes a tip configured to be received by the slot of the ram air turbine. The stow lock pin also includes a rod coupled to the tip and having an axial distance that is larger than the first distance.

BRIEF DESCRIPTION OF THE DRAWINGS

The subject matter of the present disclosure is particularly pointed out and distinctly claimed in the concluding section of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosure, it should be understood that other embodiments may be realized and that logical, chemical and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

As used herein, "aft" refers to the direction associated with the tail (e.g., the back end) of an aircraft, or generally, to the direction of exhaust of the jet engines. As used herein, "forward" refers to the directed associated with the nose (e.g., the front end) of an aircraft, or generally, to the direction of flight or motion.

Figure 1:
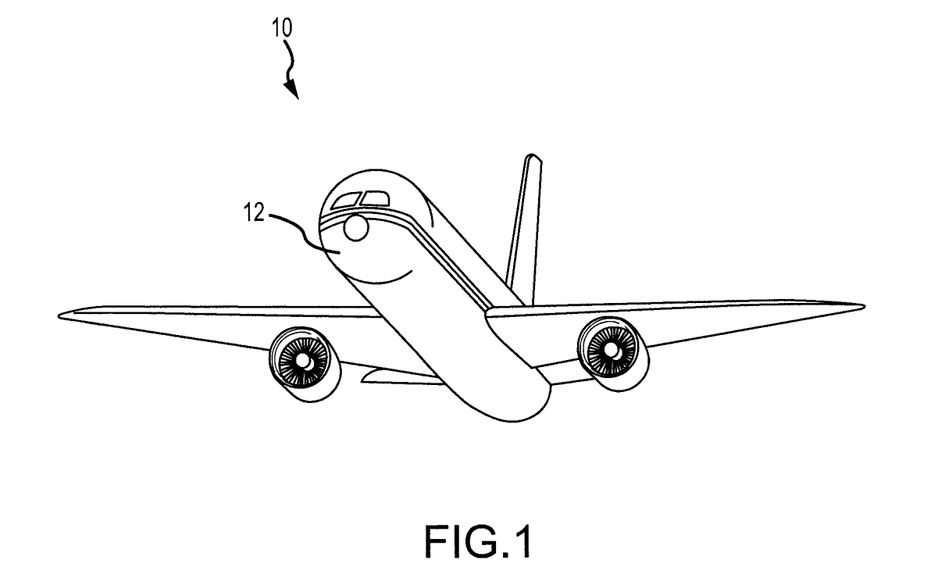
FIG. 1 illustrates a perspective view of an aircraft, in accordance with various embodiments.
Figure 2:
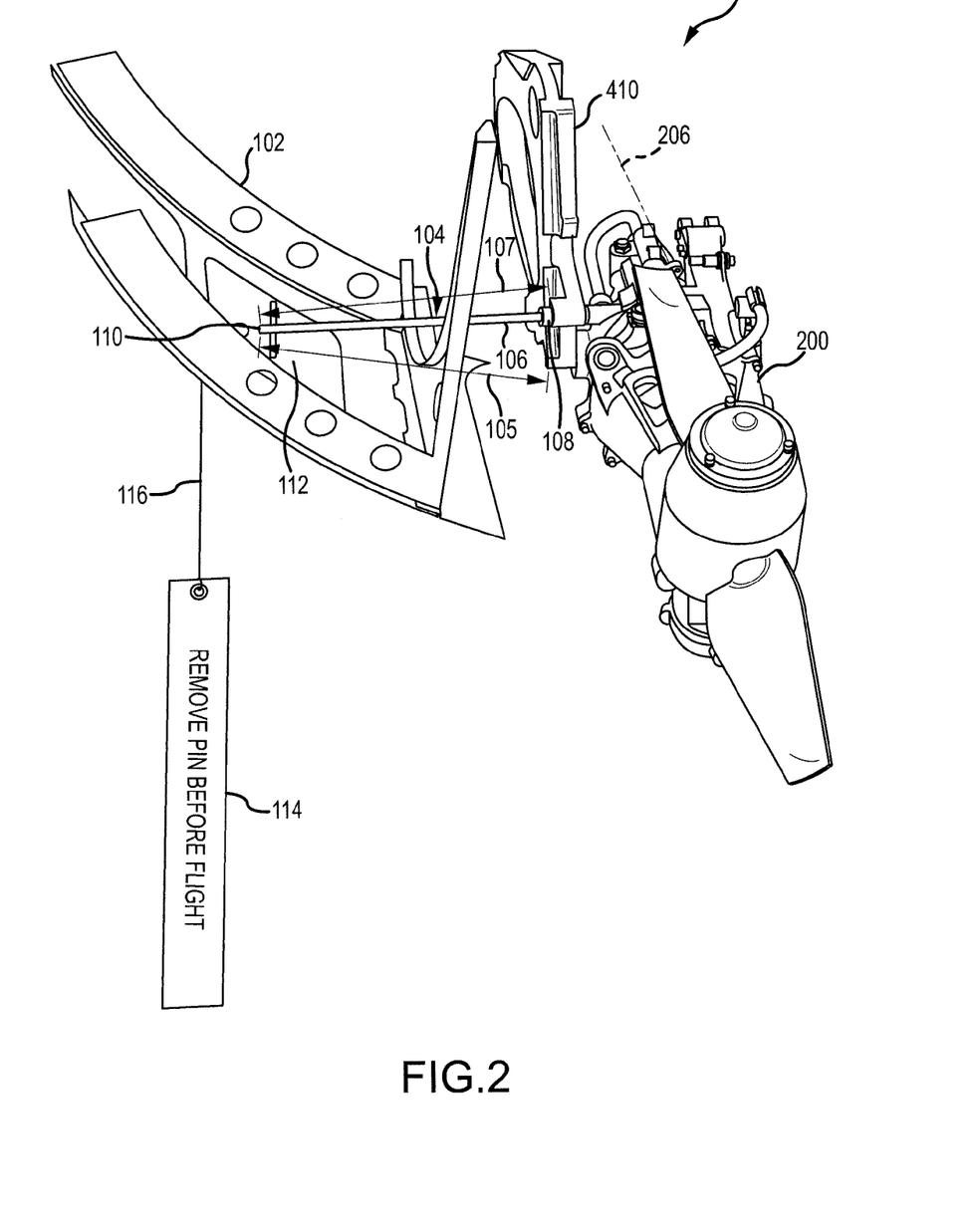
FIG. 2 illustrates an interior portion of an aircraft including a ram air turbine, in accordance with various embodiments.

In various embodiments and with reference to FIGS. 1 and 2, an aircraft 10 may comprise a nose 12. A ram air turbine 100 may be located within nose 12 of aircraft 10 or may be located in the fuselage, belly fairing or wings of aircraft 10. Typically, ram air turbine 100 may be in a stowed position within an aircraft frame 102 of aircraft 10. Ram air turbine 100 may be deployed manually or automatically in response to certain criteria, such as a loss of power or a request by a pilot. With momentary reference to FIGS. 1, 2 and 5, when deployed, an actuator 400 of ram air turbine 100 causes a portion of ram air turbine to extend from within aircraft frame 102 into an external airstream. Returning to FIGS. 1 and 2, when extended into the airstream, ram air turbine 100 generates power for aircraft 10. During maintenance procedures, it is desirable for ram air turbine 100 to remain in a stowed position to prevent an inadvertent deployment and potential injury to person or property.

With reference to FIG. 2, aircraft frame 102 defines an access panel which, when removed, provides an access window 112 that is aligned, radial to a longitudinal axis 206 of aircraft frame 102, with a portion of ram air turbine 100. During maintenance, a stow lock pin 104 may be inserted through access window 112 and received by ram air turbine 100. Stow lock pin 104 may prevent deployment of ram air turbine 100 while received by ram air turbine 100.

As part of maintenance of aircraft 10, an operator may remove an access panel forming access window 112. In response to completion of maintenance, it is desirable for stow lock pin 104 to be removed from ram air turbine 100. Accordingly, it is undesirable for the access panel to be replaced while stow lock pin 104 is received by ram air turbine 100, as ram air turbine 100 will not deploy while receiving stow lock pin 104. Stow lock pin 104 includes a rod 106 and a tip 108. To increase the likelihood of stow lock pin 104 being removed after completion of maintenance, rod 106 extends from ram air turbine 100 to beyond aircraft frame 102 while stow lock pin 104 is received by ram air turbine. In other words, rod 106 has a length 107 that is larger than a distance 105 between ram air turbine and access window 112. As a result, rod 104 protrudes from the fuselage of aircraft 10, such that it is very difficult to replace the access panel while ram air turbine is receiving stow lock pin 104. The pilot or maintenance person would likely see the missing access panel and remove stow lock pin 104 during a pre-flight walk around.

A distal end 110 of rod 106 extends beyond aircraft frame 102. To further increase the likelihood that stow lock pin 104 will be removed prior to flight, a flag 114 may be coupled to distal end 110. For example, a cable 116 may couple flag 114 to distal end 110. Flag 114 serves as a visual reminder for a repair worker to remove stow lock pin 104 from ram air turbine 100. Because distal end 110 extends beyond aircraft frame 102, the likelihood of flag 114 being positioned interior to aircraft frame 102 is reduced as compared to a stow lock pin that does not extend beyond an aircraft frame.

Stow lock pin 104 also includes a tip 108 that extends through a side frame 410 of ram air turbine 100 into a portion of a generator 200 of ram air turbine 100. Side frame 410 is coupled to aircraft frame 102 and does not move relative to aircraft frame 102 during deployment of ram air turbine 100. In various embodiments, tip 108 may extend through a portion of aircraft frame 102 instead of side frame 410. In response to deployment of ram air turbine 100, generator 200 is deployed to be external to aircraft frame 102. Thus, tip 108 may prevent generator, and in turn ram air turbine 100, from deploying by transferring force applied by generator 200 to stationary side frame 410.

Figure 3:
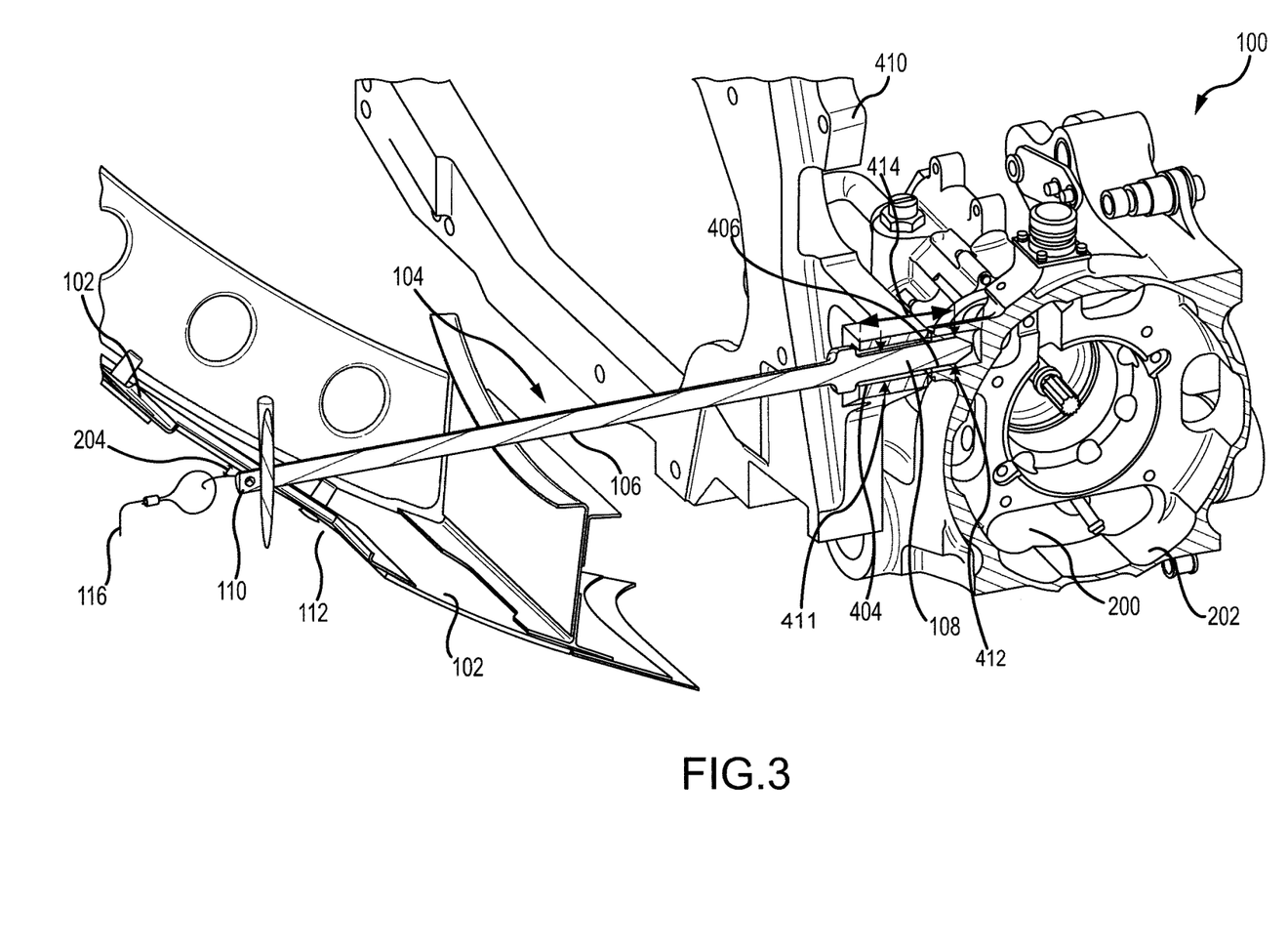
FIG. 3 illustrates a cross sectional view of the ram air turbine of FIG. 2 receiving a stow lock pin, in accordance with various embodiments.

With reference to FIG. 3, a cross section of generator 200 and side frame 410 is shown. Side frame 410 defines and/or includes a rig pin bushing 404. Rig pin bushing 404 may be a slot through side frame 410 or may be a bushing with a hole, such as a round hole, coupled to side frame 410. Generator 200 defines and/or includes a generator bushing 406 that aligns with rig pin bushing 404 when ram air turbine 100 is stowed. Tip 108 of stow lock pin 104 is adapted to be inserted through rig pin bushing 404 into generator bushing 406, such that both rig pin bushing 404 and generator bushing 406 receive tip 108 while stow lock pin 104 inserted. Tip 108 is designed to resist both actuator deployment loads and impact loads, and thus reduces the likelihood of accidental deployment of ram air turbine 100 by transferring force applied by generator 200 to stationary side frame 410.

FIG. 3 also illustrates distal end 110 of rod 106 extending beyond aircraft frame 102 by a distance 204. This extension of rod 106 beyond aircraft frame 102 reduces the likelihood of the access panel being replaced while stow lock pin 104 is inserted into ram air turbine 100.

Figure 4:
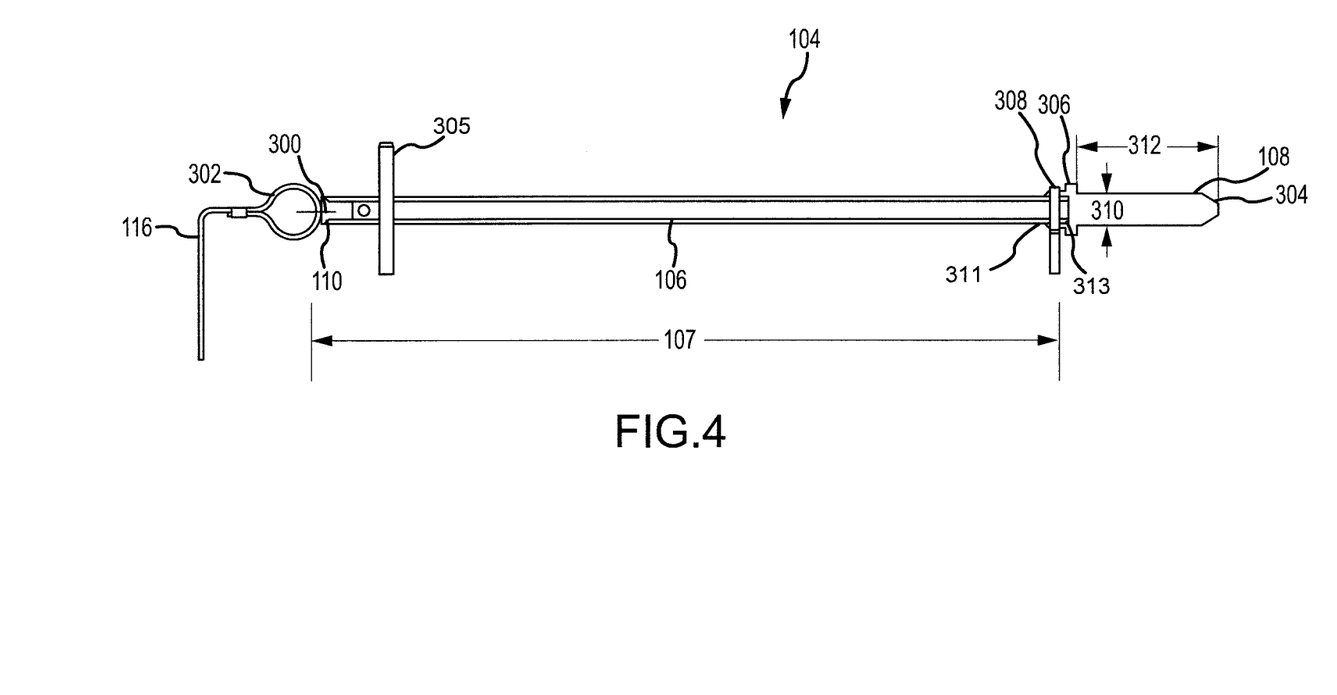
FIG. 4 illustrates the stow lock pin of FIG. 3, in accordance with various embodiments.

With momentary reference to FIG. 1, it is desirable for the weight of aircraft 10 to be minimized. With reference to FIG. 4, as stow lock pin 104 is typically stored in an aircraft flyaway kit during flight, it is desirable for a weight of stow lock pin 104 to be minimal. In various embodiments, rod 106 is hollow, reducing the weight of stow lock pin 104.

It is desirable for rod 106 to fail before tip 108 fails or damages ram air turbine 100. If rod 106 is hollow, a total tensile strength of rod 106 will be reduced, increasing the likelihood of rod 106 failing prior to tip 108.

Rod 106 includes distal end 110 and a proximal end 311. With brief reference to FIGS. 3 and 4, distal end 110 includes a flag feature 300. Flag feature 300 may include an annular portion or a clevis which allows flag 114 to be coupled to stow lock pin 104 so that flag 114 can be attached and detached from stow lock pin 104 as desired. In various embodiments, flag feature 300 may be permanently affixed to rod 106 or flag feature 300 may be removably coupled to rod 106, such as by a press-fit feature.

With reference to FIG. 4, it is desirable for rod 106 to fail before tip 108 fails or damages ram air turbine 100 in response to force being applied to distal end 110. In various embodiments, rod 106 is designed such that it will fail (i.e., bend or break) in response to between 100 pounds of force (~444 N) and 300 pounds of force (~1,334 N) being exerted on distal end 110 of rod in a direction perpendicular to rod 106. In various embodiments, rod 106 may be designed to fail in response to between 150 pounds (~667 N) and 250 pounds (~1,112 N) being applied to distal end 110.

Rod 106 includes a material of lower tensile strength than a material of tip 108. For example, rod 106 may comprise aluminum, copper or the like. In various embodiments, rod 106 may comprise a plastic. Plastic typically has a lower breaking point than metal, so a plastic rod 106 is more likely to fail prior to tip 108 failing.

As opposed to rod 106, it is desirable for tip 108 to include a material having a sufficient tensile strength that it can resist at least as much force as applied by generator 200 during actuation of ram air turbine 100. In various embodiments, tip 108 may include a steel or stainless steel alloy, such as a stainless steel alloy comprising between 0.9 and 1.35% wt/wt aluminum, between 12.25 and 13.25% wt/wt chromium, 76% wt/wt iron, and 7.5 to 8.5% wt/wt nickel, commonly known as 13-8 MO™ (available from AK Steel, Westchester, Ohio) or a stainless steel allow comprising between 71 and 80% wt/wt iron, between 14 and 15.5% wt/wt chromium, between 3.5 and 5.5% wt/wt nickel, commonly known as 15-5 PH™ (available from AK Steel, Westchester, Ohio), wherein wt/wt may refer to weight of the constitutent/weight of the entire composition.

A cross beam 305 is positioned closer to distal end 110 than proximal end 311. In various embodiments, cross beam 305 may be permanently affixed to rod 106 or, in various embodiments, it may be removably coupled to rod 106. Cross beam 305 provides a feature allowing a user to grasp stow lock pin 104 to remove stow lock pin 104 from ram air turbine 100. In various embodiments, cross beam 305 may be between three (3) and six (6) inches long. In some embodiments, cross beam 305 may include a rolled steel pin such that cross beam 305 is self retaining with a relatively looser fit on the mating bore.

Tip 108 includes a proximal end 313 and a distal end 304. Proximal end 311 of rod 106 is coupled to proximal end 313 of tip 108. Proximal end 311 may be coupled to proximal end 313 by a cross pin 308. In some embodiments, proximal end 311 may be coupled to proximal end 313 by brazing. Cross pin 308 may insert through slots of proximal end 311 and proximal end 313, effectively coupling proximal end 311 to proximal end 313. Because tip 108 may be removably coupled to rod 106, if either tip 108 or rod 106 fails, the failed part can be replaced without replacement of entire stow lock pin 104. Additionally, because tip 108 may be removably coupled to rod 106, tip 108 may be heat treated prior to coupling with rod 106. This ability to heat treat tip 108 allows a tensile strength of tip 108 to be increased.

A stop 306 is positioned near proximal end 313. A distance 312 exists from stop 306 to distal end 304. Stop 306 may have a diameter that is larger than a diameter 310 of the rest of tip 108, and prevent ram air turbine 100 from receiving more of stow lock pin than the portion with distance 312. This may prevent damage to ram air turbine 100.

With reference to FIGS. 3 and 4, rig pin bushing 404 aligns with generator bushing 406 in response to ram air turbine 100 being in a stowed position. This alignment allows tip 108 to insert through rig pin bushing 404 and into generator bushing 406.

A distance 414 exists through rig pin bushing 404, from rig pin bushing 404 to generator bushing 406 and through generator bushing 406. Distance 312 of tip 108 is sufficient such that tip 108 can engage rig pin bushing 404 and generator bushing 406. In response to stop 306 being positioned substantially adjacent rig pin bushing 404, it may be determined that stow lock pin 104 is correctly received by ram air turbine 100.

Distal end 304 of tip 108 may come to a point (i.e., a vertex). In various embodiments, distal end 304 may have a conical shape, with the vertex at distal end 304. Because distal end 304 has a vertex, it may more easily be received by rig pin bushing 404 and generator bushing 406.

Figure 5:
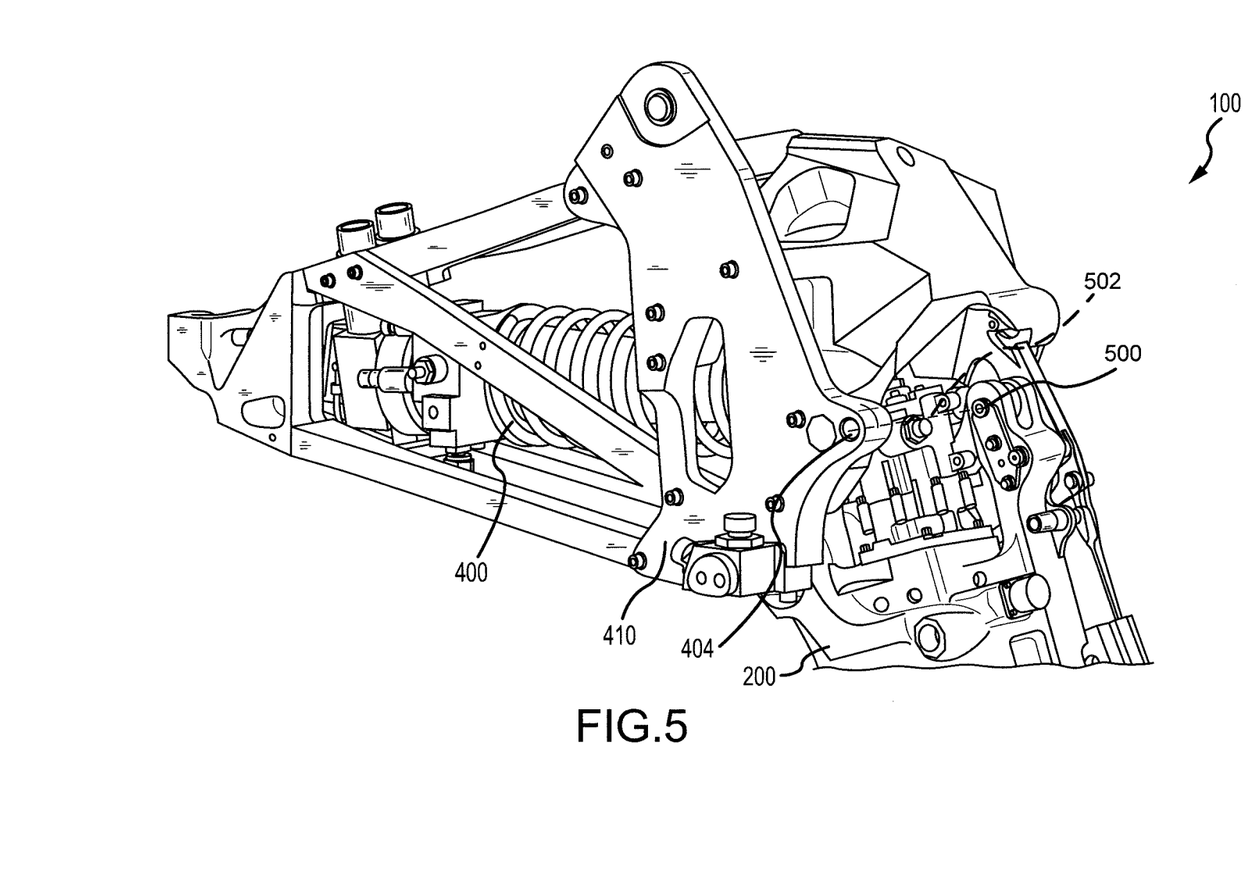
FIG. 5 illustrates another portion of the ram air turbine of FIG. 2 including a rig pin bushing and a generator bushing bore, in accordance with various embodiments.

With reference now to FIG. 5, ram air turbine 100 is illustrated in a deployed position. A common centerline 502 exists between generator 200 and actuator 400 by design. When ram air turbine 100 is deployed, common centerline 502 is aligned with rig pin bushing 404 as indicated by line 502. A rigging fixture may be used that is adjusted to have a first pin in rig pin bushing 404 and a second pin in a frame bushing 500 at the back of actuator 400. The rigging fixture may then be used to set a length of actuator 400 accurately so that the second pin is on common centerline 502 with rig pin bushing 404. Actuator 400 has an accurate, known stroke such that when actuator 400 retracts, the stowed generator housing (including generator bushing 406) will be at a known position within a small tolerance (i.e., within +/−1 mm (0.039 inches). Accordingly, when ram air turbine 100 is stowed, rig pin bushing 404 will be aligned with generator bushing 406 (within a small tolerance).

With reference now to FIGS. 3-5, tip 108 has a diameter 310. Rig pin bushing 404 has a diameter 411 and generator bushing 406 has an inner diameter 412. Inner diameter 412 must be large enough to account for any tolerances from the rigging method. Use of the method described above will reduce the required size of inner diameter 412 as it is relatively more accurate than other rigging methods.

In various embodiments, diameter 310 may be substantially the same as (i.e., within 90 percent (90%) to 100%) diameter 411 and/or diameter 412. Because diameter 310 is substantially the same as diameter 411 and/or diameter 412, generator 200 of ram air turbine 100 may apply a minimal force to tip 108 if accidentally deployed. If a diameter of a generator bushing were substantially larger than a diameter of a tip of a stow lock pin, then a generator may exert a larger force on the tip, as the generator may have a "running start," meaning that the generator accelerate prior to applying force to the tip for a higher impact load. The rigging method described above reduces the required size of diameter 412 to reduce the impact loads when ram air turbine 100 is inadvertently deployed with stow lock pin 104 in place to lock ram air turbine 100 in the stowed position.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A stow lock pin for use in preventing deployment of a ram air turbine of an aircraft, the aircraft having a first distance from the ram air turbine to an access window, the stow lock pin comprising:
   a tip configured to be received by a slot of the ram air turbine and having a tip proximal end defining a first slot;
   a rod having a length that is greater than the first distance and including a rod proximal end defining a second slot; and
   a cross pin configured to be received by the first slot and the second slot, and configured to removably couple the tip to the rod.

2. The stow lock pin of claim 1, wherein the tip is configured to be received by a generator bushing defined by a generator of the ram air turbine and a rig pin bushing defined by a side frame of the ram air turbine.

3. The stow lock pin of claim 2, wherein the tip has a tip distance sufficiently great to extend through the rig pin bushing, from the rig pin bushing to the generator bushing, and through at least a portion of the generator bushing such that the tip engages the rig pin bushing and the generator bushing in response to extending through the rig pin bushing and the generator bushing.

4. The stow lock pin of claim 2, wherein the tip has a first diameter that is substantially the same as a second diameter of the rig pin bushing and a third diameter of the generator bushing.

5. The stow lock pin of claim 1, wherein the rod is hollow.

6. The stow lock pin of claim 1, wherein the tip comprises a stainless steel alloy comprising between 0.9 and 1.35% wt/wt aluminum, between 12.25 and 13.25% wt/wt chromium, 76% wt/wt iron, and 7.5 to 8.5% wt/wt nickel.

7. The stow lock pin of claim 1, wherein the rod comprises plastic.

8. The stow lock pin of claim 1, wherein the tip is conical such that a distal end of the tip defines a vertex.

9. The stow lock pin of claim 1, further comprising a flag feature coupled to a distal end of the rod.

10. The stow lock pin of claim 1, wherein a proximal end of the tip defines a stop having a larger diameter than a remainder of the tip.

11. A system comprising:
a ram air turbine defining a first slot and configured to be coupled to an aircraft such that a first distance exists between the ram air turbine and an access window defined by a frame of the aircraft; and
a stow lock pin comprising:
a tip having a conical shape such that a distal end of the tip defines a vertex, the tip being configured to be received by the first slot of the ram air turbine and having a tip proximal end defining a first slot;
a rod having a length that is greater than the first distance and including a rod proximal end defining a second slot; and
a cross pin configured to be received by the first slot and the second slot, and configured to removably couple the tip to the rod.

12. The system of claim 11, wherein the ram air turbine includes a side frame defining a second slot and the tip is further configured to be received by the second slot.

13. The system of claim 12, wherein the ram air turbine includes an actuator and a generator coupled by a joint, the joint defining a third slot such that the slot aligns with the second slot in response to the ram air turbine being stowed and the second slot aligns with the third slot in response to the ram air turbine being deployed.

14. The system of claim 11, wherein the tip has a first diameter that is substantially the same as a second diameter of the slot.

15. A stow lock pin for use in preventing deployment of a ram air turbine of an aircraft, the aircraft having a first distance from the ram air turbine to an access window, the stow lock pin comprising:
a tip having a conical shape such that a distal end of the tip defines a vertex, the tip being configured to be received by the first slot of the ram air turbine and having a tip proximal end defining a first slot;
a rod coupled to the tip and having a length that is greater than the first distance and including a rod proximal end defining a second slot; and
a cross pin configured to be received by the first slot and the second slot, and configured to removably couple the tip to the rod.

16. The stow lock pin of claim 15, wherein the tip is configured to be received by a generator bushing defined by a generator of the ram air turbine and a rig pin bushing defined by a side frame of the ram air turbine.

17. The stow lock pin of claim 16, wherein the tip has a tip distance sufficiently great to extend through the rig pin bushing, from the rig pin bushing to the generator bushing, and through at least a portion of the generator bushing such that the tip engages the rig pin bushing and the generator bushing in response to extending through the rig pin bushing and the generator bushing.

18. The stow lock pin of claim 16, wherein the tip has a first diameter that is substantially the same as a second diameter of the rig pin bushing and a third diameter of the generator bushing.

19. The stow lock pin of claim 15, wherein the rod is hollow.

* * * * *